Sept. 8, 1942.　　　　J. W. HAMILTON　　　　2,295,109
VALVE

Filed Feb. 25, 1941

Inventor
John W. Hamilton
By L. B. James
Attorney

Patented Sept. 8, 1942

2,295,109

UNITED STATES PATENT OFFICE 2,295,109

VALVE

John W. Hamilton, San Francisco, Calif.

Application February 25, 1941, Serial No. 380,537

4 Claims. (Cl. 251—103)

This invention relates to valves and especially the plug type of valves wherein a plug having a transverse opening may be turned on its axis to open and close such a valve.

More particularly the invention relates to a liner or bushing for such valves wherein such liner or bushing may be adjusted for wear between the body and plug member of such a valve.

One important object of the present invention is to provide a novel form of bushing or liner for such a valve.

A second important object of the invention is to provide a novel form of non-revoluble bushing or liner for such a valve.

A third important object of the invention is to provide a novel bushing or liner with means for adjusting the same within the valve body or casing.

With the above and other objects in view, as will be presently apparent, the invention consists in general of certain novel combinations of parts and arrangements of elements hereinafter fully described, illustrated in the accompanying drawing and particularly pointed out in the appended claims.

In the accompanying drawing like characters of reference indicate like parts in the several views and:

Figure 1:
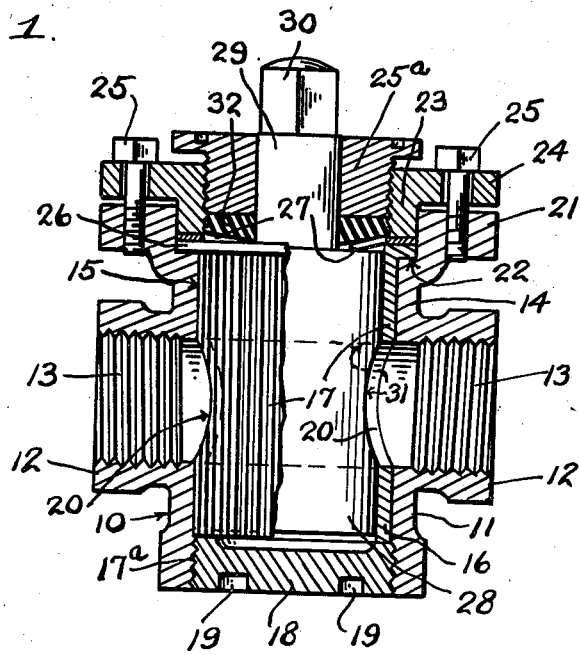
Fig. 1 illustrates a section, partially in elevation taken diametrically through a valve constructed in accordance with the present invention.
Figure 2:
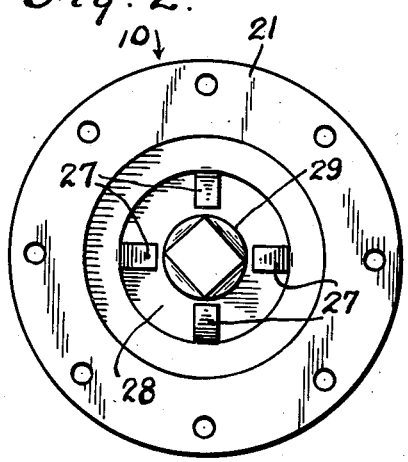
Fig. 2 is a top plan view of the invention.
Figure 3:
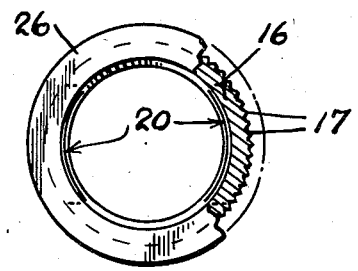
Fig. 3 is a horizontal section through the invention.

In carrying out the objects of the present invention in accordance with the form shown herein there is provided a valve body indicated in general at 10. This valve body has a central portion 11 of substantially cylindrical form. This body is provided with a pair of diametrically opposed inlet and outlet connections 12 which are here shown as having internally pipe threaded portions 13. It is to be understood that the portions 12 are merely here illustrated to indicate means whereby the valve may be interposed in any pipe line and in place of the internally threaded pipe connections 13 any other, such as flange connections, may be used rather than the screw connection shown.

In the body 14 of this valve the internal portion is circumferentially serrated as shown at 15 in the medial portions thereof.

Within the body 10 there is arranged the novel bushing or sleeve which forms a principal part of the present invention and which is indicated in general at 16. This bushing or sleeve consists of a tubular member having an externally serrated surface 17 which is engaged with the internal serrations 15 of the valve body.

The lower end of the body 10 is internally threaded and in this lower threaded portion 17a is fitted a closure 18 having recesses 19 therein for the reception of a suitable wrench. The bushing or sleeve 16 has parts or openings 20 which, when the sleeve is properly positioned in the body 10, aline with the inlet and outlet openings of said body. The sleeve rests at its lower end on the closure 18.

The upper end of the body 10 is provided with an outwardly extending flange 21 so arranged as to provide an offset shoulder 22 at the top of the body 10 to form an enlarged bore at the top of the body. A cover plate 23 is fitted in this bore and is provided with a flange 24 overlying the flange 21 and secured thereto by the cap screws 25. This cover plate is of annular or any suitable form and is internally threaded to receive the lower and threaded end portion of a packing gland nut 25a. On the shoulder 22 rests the flange 26 of the sleeve 16 and between the flange and the lower end of the nut 25a is interposed a spring 27 of any suitable form which serves to hold the flange 26 firmly on the shoulder 22.

The sleeve 16 is inwardly of inverted frustoconical form, being tapered slightly from top to bottom whereby to provide a tight fit for a correspondingly tapered plug valve 28 having a stem 29 which projects through the nut 25a to provide a square end 30 on which may be fitted any suitable means, such as a handle or wrench, for turning the plug to bring the opening 31 thereof into and out of alinement with the connections 12 so as to open and close the valve.

Between the lower end of the plate 25 and the top of the plug 28 there is provided the usual packing 32 to prevent leakage of the valve.

It will be understood that the operation of this valve is accomplished in the usual manner by turning the plug.

The sleeve or liner bushing may be made of any desired material such as a Bakelite or other plastic, Babbitt metal, graphited bronze or even soft lead. When wear occurs the sleeve may be readily removed and a new sleeve inserted, the serrations on the exterior of the sleeve and interior of the body serving to hold the sleeve in proper position relative to the inlet and outlet openings of the body.

Having thus described my invention what I claim and desire to protect by Letters Patent is:

1. The combination of a plug valve body having a cylindrical bore longitudinally serrated internally, a replaceable sleeve having a tapered bore fitted in said body and externally serrated to correspond with the serrations of the cylindrical bore in the body, and a tapered plug rotatably mounted in said sleeve, said body having a removable closure at its lower end and whereon said sleeve rests, said body having an enlarged opening at its upper end to form a shoulder and the sleeve having a flange at its upper end resting on said shoulder.

2. The combination of a plug valve body having a cylindrical bore longitudinally serrated internally, a replaceable sleeve having a tapered bore fitted in said body and externally serrated to correspond with the serrations of the cylindrical bore in the body, and a plug rotatably mounted in said sleeve, said body having an enlarged opening at its upper end to form a shoulder and the sleeve having a flange at its upper end resting on said shoulder, a closure for the upper end of said body, and a spring interposed between the flange of the sleeve and the last mentioned closure with inwardly directed portions thereof bearing on the top of the plug.

3. The combination of a plug valve body having a cylindrical bore therethrough longitudinally serrated and communicating with inlet and outlet openings, a replaceable cylindrical sleeve externally serrated to correspond with serrations in the cylindrical bore of the body and having inlet and outlet openings registering with the openings in the body and a tapered bore therein, a tapered plug having a transverse opening movable into and out of register with the openings in the body and sleeve, a movable closure disposed in the lower end of the bore in the body with a portion of its inner surface resting against the lower edge of the sleeve, an annular flange on the upper end of the sleeve seated on a shoulder in the body, a spring resting on the flange with portions thereof engaging the top of the plug, means simultaneously securing the sleeve and spring in the body, a stem on the tapered plug, and a packing gland surrounding the stem.

4. In a plug valve a hollow body having inlet and outlet openings in its medial portion communicating with a cylindrical serrated bore extending inwardly from an annular shoulder formed at the base of an enlarged opening in one end of the hollow body and in axial alignment with said serrated bore, a replaceable cylindrical sleeve having its periphery externally serrated and meshed with the serrations of the bore, said sleeve having a tapering smooth bore, a tapered plug rotatably seated in the smooth bore of the sleeve and having an opening therethrough adapted to register with said inlet and outlet openings in the valve body when opened, an annular flange formed on the sleeve and resting on the aforesaid shoulder, a ring-shaped washer resting on the upper surface of the flange, resilient fingers formed on the ring-shaped washer and having their free ends bearing on the upper surface of the plug, a cover plate having an inwardly extending boss fitted in said enlarged opening in the hollow body with its inner end bearing on the ring-shaped washer, means securing the cover plate to the hollow body, a centrally apertured packing gland threadedly engaged in a centrally disposed aperture in the cover plate, a stem formed on the plug and extending through the aperture in the packing gland and a threaded plug equal in diameter to the sleeve screwed into the bore of the hollow body at its lower end, said plug covering the lower ends of the serrations in the sleeve.

JOHN W. HAMILTON.